Aug. 4, 1925.  
L. P. GREEN  
CLUTCH  
Original Filed Dec. 30, 1922  2 Sheets-Sheet 1  
1,548,035

Witnesses:

Inventor:
Leslie P. Green
By Joshua R H Potts
His Attorney.

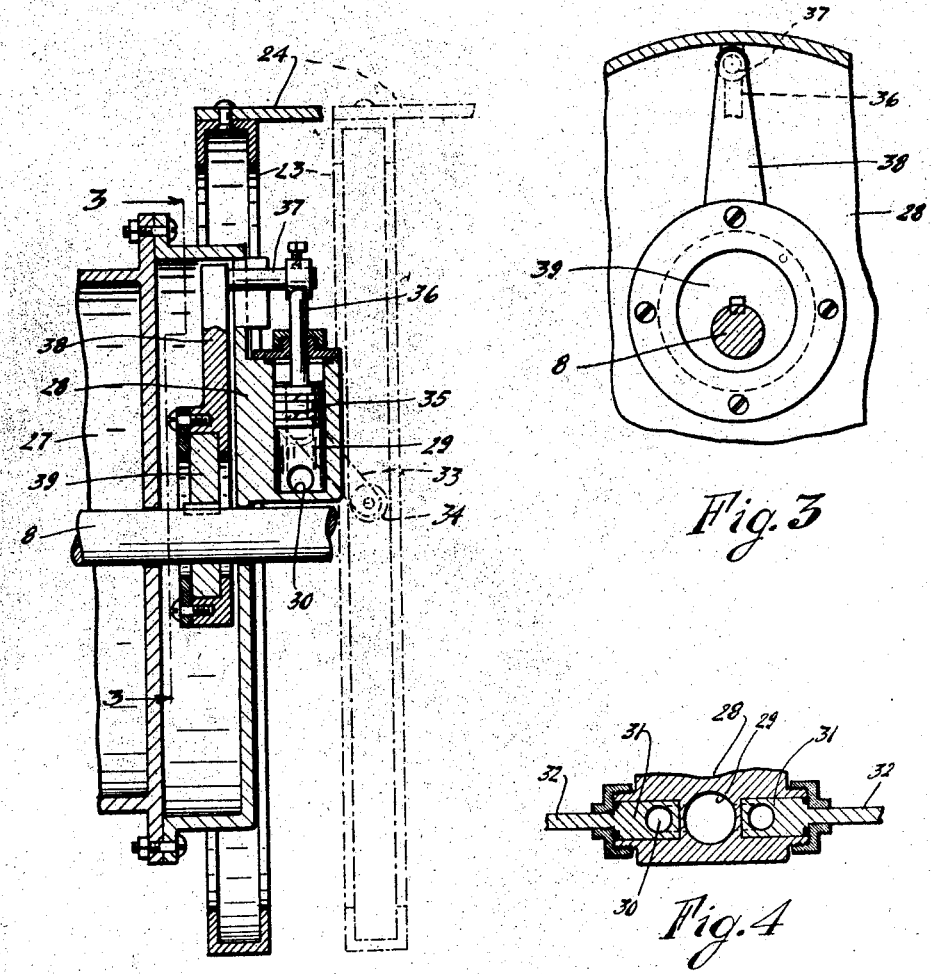

Patented Aug. 4, 1925.

1,548,035

UNITED STATES PATENT OFFICE.

LESLIE P. GREEN, OF CHICAGO, ILLINOIS.

CLUTCH.

Original application filed December 30, 1922, Serial No. 609,817. Divided and this application filed November 26, 1923. Serial No. 677,142.

*To all whom it may concern:*

Be it known that I, LESLIE P. GREEN, a citizen of the United States, and a resident of the city of Chicago, county of Cook, and State of Illinois, have invented certain new and useful Improvements in Clutches, of which the following is a specification.

My invention relates to improvements in clutches and has for its principal object the provision of an improved construction of this character which is highly efficient in use, the present application being a division of my prior application, filed December 30, 1922, Serial No. 609,817.

Other objects will appear hereinafter.

The invention consists in the combinations and arrangements of parts hereinafter described and claimed.

The invention will be best understood by reference to the accompanying drawings forming a part of this specification, and in which, Fig. 1 is a sectional view of a clutch mechanism embodying the invention;

Fig. 2 is a section taken on line 2—2 of Fig. 1;

Fig. 3 is a section taken on line 3—3 of Fig. 2;

Fig. 4 is a section taken on line 4—4 of Fig. 1; and

Fig. 5 is a section taken on line 5—5 of Fig. 1.

Figure 1:
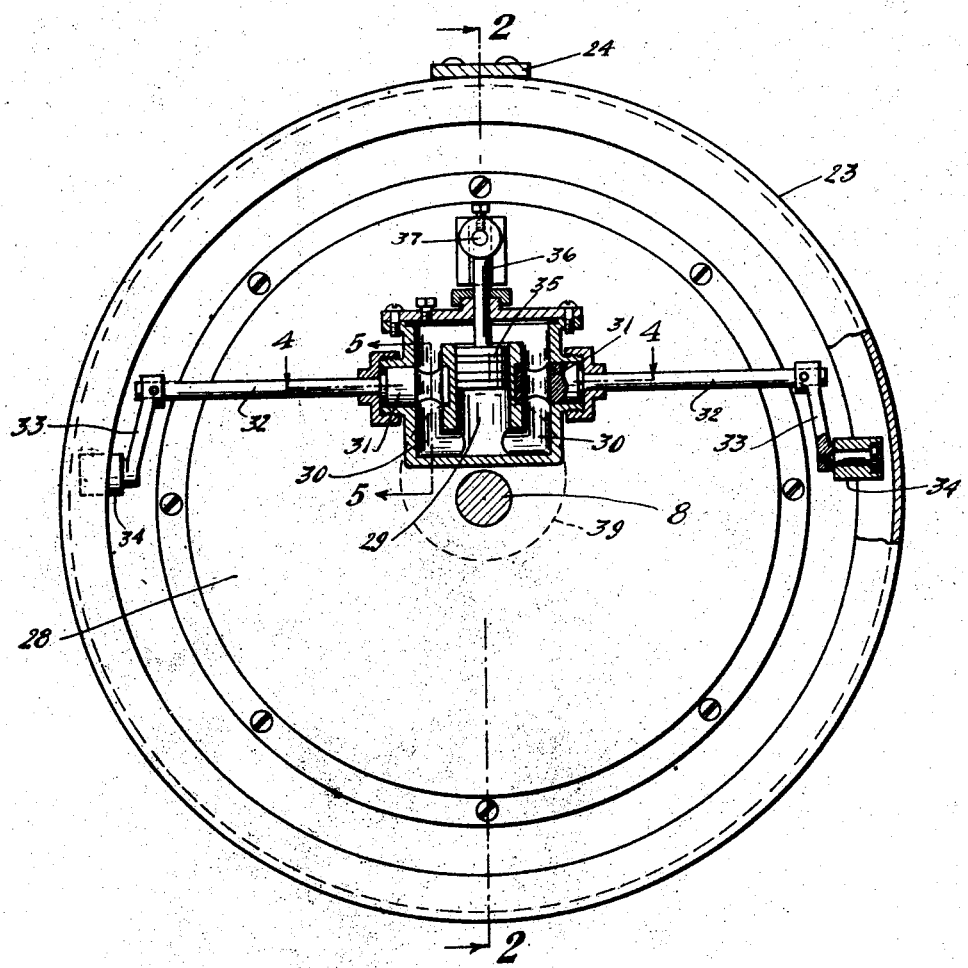

The preferred form of construction as illustrated in the drawings comprises a clutch member 27 loosely mounted on a shaft 8. The clutch member 27 may be a pulley or other member to be driven and the shaft may be any driven shaft such as a drive shaft of an automobile, the clutch mechanism disclosed being arranged to either connect or release the member 27 from the shaft 8 as will be readily understood by those skilled in this art. The clutch member 27 carries a bar or bracket 28 loose on shaft 8. A cylinder 29 is formed on the bracket 28 and passageways 30 connect the opposite ends of said cylinder as shown, the opposite ends of the cylinder being otherwise closed. Valves 31 are arranged in the passageways 30 and are operated by valve stems or shafts 32 carrying crank arms 33 having rollers 34 running in an annular channel member 23. An operating bar 24 is connected with the channel member 23 and by means of which said valves may be simultaneously adjusted to stop or regulate the flow of oil through the passageways 30 while the parts are in operation. A piston 35 operates in the cylinder 29 and is connected by a rod 36 with a pin 37 mounted on an eccentric strap member 38 operating on an eccentric 39 fixed to the shaft 8.

In operation the cylinder 29 and connecting passages 30 are filled with oil. When the valves 31 are adjusted to full open position, rotation of shaft 8 causes operation of piston 35 in cylinder 29, and the oil in said cylinder and passage ways simply idly circulates, permitting the clutch member 27 to remain stationary or idle. However, when the valves 31 are adjusted to close or partly close the passageways 30, the free circulation of the oil is prevented and resistance thus provided to the free reciprocations of the piston 35. This resistance throws a reaction on the clutch member 27 depending upon the extent of the closure of the valves 31, thus causing the clutch member 27 to rotate. If the valves 31 are completely closed, the piston 35 will be substantially locked against movement and thus the clutch member 27 locked to the shaft 8. By properly adjusting the valves 31 the speed of rotation of the clutch member 27 may be regulated as desired. This arrangement furnishes a simple and effective means for connecting the clutch member 27 with the shaft 8 and also regulating the speed of the clutch member. Power may be transmitted from the clutch member 27 by means of a belt or other suitable desired means. The arrangement disclosed, constitutes a very simple and effective means of connection between a shaft and its corresponding clutch member.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent, is:

The combination with a shaft, of a clutch member loosely mounted on said shaft; a cylinder carried by said clutch member, there being passageways connecting the opposite ends of said cylinder; valves in said passageways; means including stems carrying rollers and an abutment therefor for adjusting the valves; an eccentric secured to said shaft adjacent said cylinder; an eccentric strap member operating on said eccentric; a pin on said strap member; a piston in said cylinder; and a connecting rod connecting said pin and said piston, substantially as described.

In testimony whereof I have signed my name to this specification in the presence of two subscribing witnesses.

LESLIE P. GREEN.

Witnesses:
JOSHUA R. H. POTTS,
FREDA C. APPLETON.